Nov. 4, 1969   R. A. CARLSON   3,476,950
ALTERNATOR-RECTIFIER-CONTROL CIRCUIT
Original Filed Dec. 11, 1957
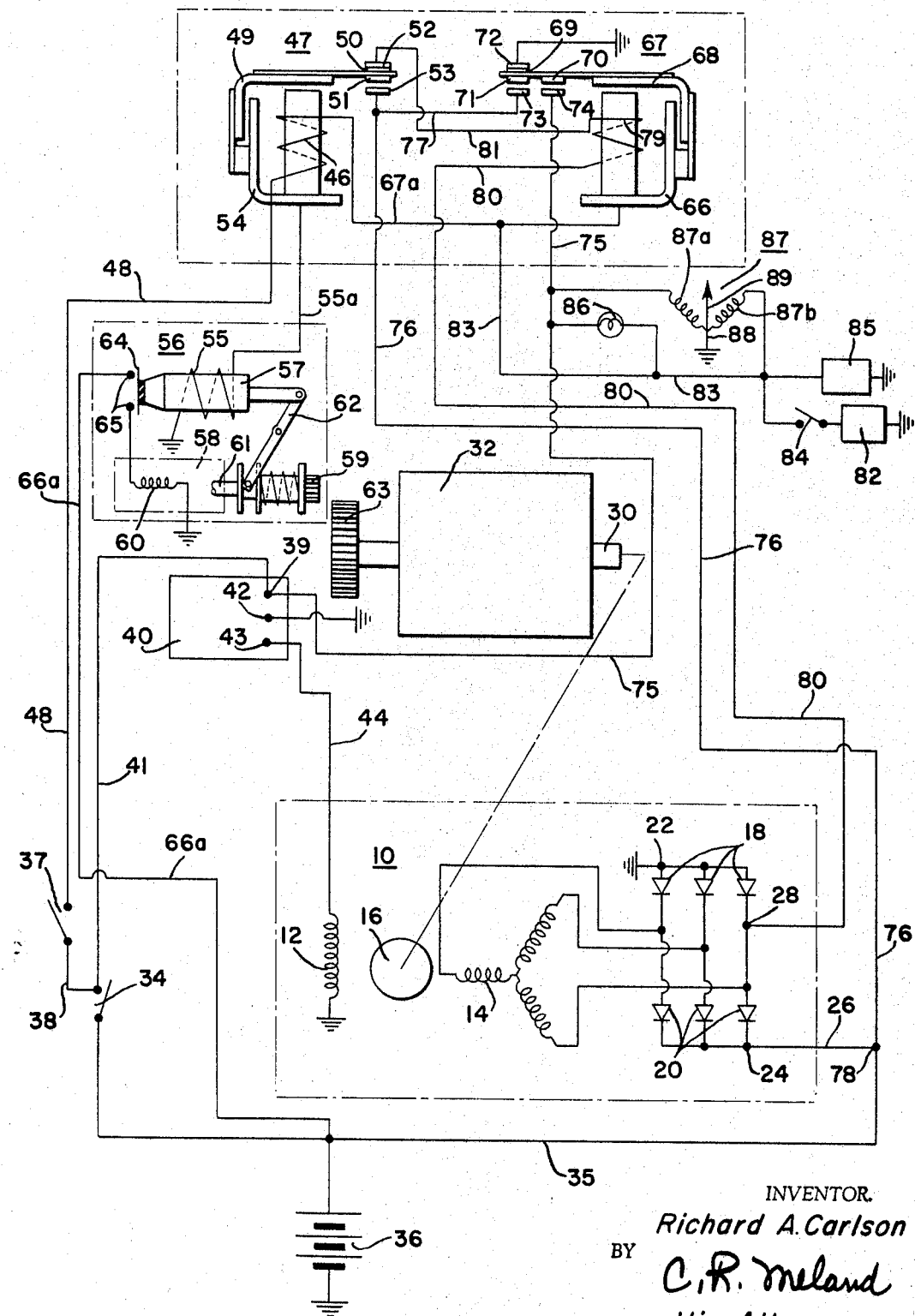
INVENTOR.
Richard A. Carlson
BY
C. R. Meland
His Attorney

United States Patent Office 3,476,950
Patented Nov. 4, 1969

3,476,950
ALTERNATOR-RECTIFIER CONTROL CIRCUIT
Richard A. Carlson, Clarkston, Mich., assignor to General Motors Corporation, Detroit, Mich., a corporation of Delaware
Original application Dec. 11, 1957, Ser. No. 702,000, now Patent No. 3,037,124, dated May 29, 1962. Divided and this application June 12, 1961, Ser. No. 116,349
Int. Cl. F02n 11/08, 11/10
U.S. Cl. 290—38    7 Claims

ABSTRACT OF THE DISCLOSURE

A field energizing system for a motor vehicle power supply system including an alternating current generator which supplies direct current to a battery through a bridge rectifier. The battery is directly connected across the output terminals of the bridge rectifier and a circuit, including a manually operable switch, is utilized to initially energize the field of the generator from the battery through a voltage regulator. This initial energizing circuit is bypassed by a circuit including the contacts of a relay which has an actuating coil. The relay actuating coil is connected between two rectifiers of the bridge rectifier and one of the direct current output terminals of the bridge rectifier so that the relay cannot be energized by the battery but is energized whenever the output winding of the alternating current generator develops a predetermined voltage.

---

This invention relates to motor vehicle electrical circuitry, and more particularly to a control circuit wherein the output of a generator is used as a signal voltage to control various switching operations in the circuit. This control system is designed to operate with any alternating-current generator-rectifier combination which has an electrical or electromechanical means of controlling generator field current.

This application is a division of application, S.N. 702,000, filed on Dec. 11, 1957, and now Patent 3,037,124.

An object of this invention is to provide an electrical circuit wherein a generator feeds a plurality of loads including a storage battery and wherein circuitry is provided for preventing energization of certain of the loads by the storage battery when the generator is not producing an output voltage. With this arrangement, the battery cannot be quickly drained of its stored power by the connection of the battery to a high-current load, and thus, the possibility of draining the battery inadvertently by the operator of a bus or passenger car is eliminated.

Another object of this invention is to provide a circuit for an electrical starting motor that forms a part of a vehicle electrical system that includes a generator, and wherein the starting motor is prevented from being energized when the generator is producing an output voltage.

Still another object of this invention is to provide a charging indicator circuit for a battery-charging circuit that includes a storage battery which is fed by an alternator through one or more rectifiers, the indicator circuit including an indicator which indicates when the generator is producing an output voltage, and which indicates a discharge condition when the battery is supplying current to the load.

A further object of this invention is to provide a circuit including switch mechanism for connecting the output of a generator with a voltage regulator in such a manner that the voltage drops through the leads connecting the generator and the regulator are maintained at a minimum. This feature of the invention is highly important in buses where the control switches are located at one end of the bus and the generator at an opposite end thereof, and where relatively long lead wires are used for controlling certain switching functions.

Further objects and advantages of the present invention will be apparent from the following description, reference being had to the accompanying drawings wherein a preferred embodiment of the present invention is clearly shown:

In the drawing, the single figure drawing illustrates a control circuit for a bus or other motor vehicle made in accordance with this invention.

Referring now to the single figure drawing, an alternating-current generator generally designated by reference numeral 10 is shown. The generator is of the brushless type shown in application S.N. 589,759, filed June 6, 1956, and now Patent 2,928,963 and includes a fixed field winding 12, a fixed three-phase, Y-connected output winding 14, and a metal rotor 16 that rotates between the field and output windings. The output winding 14 is connected with rectifiers 18 and 20 that are circuited in a three-phase full-wave bridge rectifier network having D.C. output terminals 22 and 24. The output terminal 22 is grounded as shown, whereas the output terminal 24 is connected with a lead 26. The bridge rectifier has a third output terminal 28 that is connected between rectifiers 18 and 20. With this arrangement, full-wave output current is supplied between terminal 24 and ground and half-wave current is supplied between terminal 28 and ground. The rotor 16 of alternator 10 is drivably connected with the drive shaft of an engine 32 that may be a diesel engine that supplies the motive power for a bus or the like.

The lead 26 that is connected with rectifier terminal 24 is connected to one side of a manually-operable diesel run switch 34 by means of a lead 35. A storage battery 36 is connected between the line 35 and ground, and the line 35 thus carries charging current to the battery 36. The opposite side of switch 34 is connected to one side of a manually-operable starter switch 37 by a lead 38, and to an input terminal 39 of a voltage regulator 40 by means of lead 41.

The voltage regulator 40 is of the type described in copending application Ser. No. 621,833 filed Nov. 13, 1956, and now United States Patent 3,332,003, granted on July 18, 1967. The regulator has a ground terminal 42 that is connected to ground, and a field terminal 43 that is connected to one side of alternator field winding 12 by a lead 44. The opposite side of the field winding is grounded as shown. The regulator, as described in application Ser. No. 621,833 and now Patent 3,332,003, has a transistor connected between input terminal 39 and field terminal 43 to control the field current passing between input terminal 39 and the grounded side of field winding 12. The conduction of the transistor is controlled as a function of the voltage appearing across the rectifier output terminals 22 and 24 which voltage appears across terminals 39 and 42 of the voltage regulator 40. The terminals 39 and 42 thus are the sensing terminals of the voltage regulator, and the voltage across these terminals controls the field current in field winding 12. It will be readily apparent that any other type of voltage regulator may be used as long as the field current in field winding 12 is controlled as a function of the voltage appearing across rectifier terminals 22 and 24.

The side of switch 37 opposite from lead 38 is connected to the actuating coil 46 of a relay generally designated by reference numeral 47, by means of a lead 48. The relay 47 has an armature 49 that carries contacts 50 and 51 which cooperate respectively with fixed contacts 52 and 53. The armature 49 is mechanically and electrically connected with a relay frame 54 that is, in turn, connected with one side of a starter actuating coil 55 by a lead 55a, the opposite side of the coil 55 being grounded.

The starter actuating coil 55 forms a component part of a conventional electric starter generally designated by reference numeral 56. The starter includes the coil 55, an armature 57 that is actuated by the coil, a starter motor 58, and a drive pinion gear 59. The motor 58 has armature and field windings designated in their entirety by reference numeral 60 and has a shaft 61 connected with drive pinion 59. A link member 62 is connected between armature 57 and a drive pinion 59, the link moving the drive pinion into engagement with a ring gear 63 that is fixed to drive shaft 30 of engine 32 when coil 55 is energized. The armature 57 carries a contact plate 64 that short circuits contacts 65 when the coil 55 is energized. One of the contacts 65 is connected with junction 78 and to one side of battery 36 by a lead 66a, whereas the other contact is connected to one side of the field and armature winding 60 of motor 58, the other side of windings 60 being grounded. With this arrangement, the starter motor 56 will crank the engine 32 whenever the actuating coil 55 is energized by shifting the drive pinion 59 into engagement with ring gear 63 and by shorting contacts 65 to provide a circuit for motor windings 60.

The side of actuating coil 46, opposite from the side connected to lead 48, is connected with the frame 66 of a relay generally designated by reference numeral 67 by a lead 67a. The relay has an armature 68 that carries contacts 69, 70 and 71, the armature being mechanically and electrically connected to frame 66. The contacts 69, 70 and 71, cooperate respectively with fixed contacts 72, 73 and 74. The fixed contact 74 is connected with a lead 75 that is, in turn, connected to the input terminal 39 of voltage regulator 40. The fixed contact 72 is connected directly to ground, as shown, while the fixed contact 73 is connected to a lead 76 by a lead 77. The lead 76 is connected between fixed contact 53 of relay 47 and the junction point 78 which connects leads 26, 35 and 76. The actuating coil 79 of relay 67 has one of its sides connected directly to rectifier terminal 28 by a lead 80. The opposite side of relay coil 79 is connected with the fixed contact 52 of relay 47 by a lead 81.

The motor vehicle circuit described has an electrically energizable load 82 of high current capacity that is grounded at one side thereof. In a motor-driven bus, this load may take the form of an electric blower motor for a blower or may be any other high current device that will put a heavy drain on the battery 36 if the device is energized by the battery for a relatively short period of time. The opposite side of load 82 is connected with a lead 83 through a manually operable switch 84. The lead 83 is connected directly to lead 67a. An electrical load 85 has one side thereof connected to lead 83 and has its other side grounded. The load 85 represents certain electrically-operated safety devices that are used on motor-driven buses.

An electric lamp having a filament 86 is connected between leads 75 and 83. This lamp, as will be more readily apparent hereinaftetr, will light up when the battery 36 is discharging and will be extinguished when the generator 10 is developing an output voltage. The circuit may be provided with another charging indicating device that takes the form of a conventional electrically-energizable meter generally designated by reference numeral 87. The meter has actuating coils 87a and 87b which are connected respectively to leads 75 and 83. The actuating coils are connected together and to a junction point 88 which is grounded. The meter has a pointer 89 which is moved in accordance with the energization of coils 87a and 87b. When both coils are energized with equal voltages, the pointer remains in a vertical position. If the coil 87a is energized with a greater voltage than coil 87b, the pointer 87 moves leftwardly, whereas when coil 87b is energized with the greater voltage, the pointer moves rightwardly. It will be readily apparent to those skilled in the art that one of the charging indicators might be eliminated if both are not desired.

The operation of the above-described circuit will now be described. When it is desired to start the engine 30, the diesel run switch 34 is closed. This connects the battery 36 with terminal 39 of voltage regulator 40, thereby supplying current to the field 12 of generator 10. The closure of switch 34 also connects one side of battery 36 with one side of signal lamp 86 and to coil 87a of meter 87 via line 35, switch 34, line 41, and line 75. The lamp 86 will light up since at this point of time the lead 83 is connected directly to ground via lead 67a, frame 66 of relay 67, armature 68 of relay 67, and contacts 69 and 72 of relay 67. The pointer 89 of meter 87 will deflect leftwardly at this time due to the fact that both sides of coil 87b are grounded while coil 87a is energized with battery voltage. The leftward deflection of pointer 87a and the lighting up of lamp 86 thus both indicate a discharging condition of the battery.

After switch 34 has been closed, the starter switch 37 is closed to energize coil 55 of starter 56 and thus begin the cranking of engine 32. The closure of switch 37 completes a circuit for relay coil 46 which may be traced from battery 36, through line 35, switch 34, line 38, switch 37, line 48, coil 46, line 67a, frame 66 of relay 67, armature 68 of relay 67, and through contacts 69 and 72 to ground. When relay coil 46 is thus energized, the armature 49 of relay 47 is attracted downwardly to open contacts 50 and 52 and close contacts 51 and 53. The closure of contacts 51 and 53 closes a circuit for starter solenoid 55 that may be traced from battery 36, through line 35, line 76, contacts 51 and 53 of relay 47, armature 49 of relay 47, frame 54 of relay 47, line 55a and then through coil 55 to ground. It is to be noted here that the armature 49 is normally in the position shown in the drawing and remains in this position until coil 46 is energized.

When engine 32 starts, the switch 37 is released and moves to an open position, thus breaking the circuit for relay coil 46 and permitting the armature 49 to move upwardly to open contacts 51 and 53 and close contacts 50 and 52. With the engine running, a voltage is generated in output winding 14 which is rectified to direct current. When the generator is producing an output voltage, the coil 79 of relay 67 is energized with half-wave current from rectifier terminal 28. This circuit may be traced from rectifier terminal 28, through line 80, coil 79, line 81 contacts 52 and 50 of relay 47, armature 49 of relay 47, frame 54 of relay 47, line 55a, and through coil 55 to ground. The starter coil 55 is not energized sufficiently to move pinion gear 59 into mesh with ring gear 63, nor is it energized sufficiently to short contacts 65, because only half-wave current is passing through coil 79 and starter coil 55. This half-wave current flowing through coil 79 is sufficient, however, to cause attraction of armature 68 downwardly to open contacts 69 and 72, and close contacts 71 and 73, and contacts 70 and 74. When the armature 68 is in its lower position, the circuit for relay coil 46 is open due to the opening of contacts 69 and 72, and thus armature 49 of relay 47 cannot be attracted to complete a circuit for starter coil 55 through contacts 51 and 53. It thus is apparent that starter coil 55 cannot be energized from battery 36 as long as generator 10 is developing an output voltage to energive relay coil 79 from rectifier terminal 28.

The closure of contatcts 71 and 73, and contacts 70 and 74, and the opening of contacts 69 and 72, which only occurs when the generator 10 is developing an output voltage, provides for important switching functions in the circuit described, other than for preventing the operation of starter 56. When contacts 70 and 74, and contacts 71 and 73 are closed, the line 83 is connected with rectifier terminal 24 via line 26, line 76, line 77, contacts 71 and 73, armature 68, frame 66, and through line 67a, to line 83. With line 83 connected to terminal 24, the loads 82 and 85 may be energized, because they are now connected between rectifier terminal 24 and ground. On the other hand, with generator 10 not developing an output voltage, the relay coil 79 stays in a deenergized condition, and the armature 68 moves to its upper position wherein contacts 71 and 73 and contacts 70 and 74 are opened and contacts 69 and 72 closed. In this position of armature 68 the lead 83 is grounded, and the loads 82 and 85 cannot be energized because their opposite sides are connected to ground. It will be apparent from the foregoing that loads 82 and 85 can only be energized when the generator 10 is producing an output voltage. This arrangement prevents connection of the loads 82 and 85 with the battery 36 when the generator 10 is not producing an output voltage, such as when the engine 32 is shut down, and thus prevents inadvertently quickly draining the battery 36 of its stored power.

The closure of contacts 71 and 73, and contacts 70 and 74 in response to the development of a voltage by generator 10 also connects input terminal 39 of voltage regulator 40 with rectifier output terminal 24. This circuit may be traced from rectifier terminal 24, line 26, line 76, line 77, contacts 71 and 73, contacts 70 and 74, and thence through line 75 to regulator terminal 39. To understand the desirability of this switching function, it is necessary to be cognizant of the physical layout of the components of this circuit on a motor-driven bus. The engine 32, relays 47 and 67, starter 56, generator 10, and rectifiers 18 and 20 are all located closely adjacent to one another at the rear of the body of the bus, whereas the switches 34 and 37 are located in the driver's compartment at the front of the bus. The leads connecting the switches 34 and 37 and the other components of the circuit illustrated will thus be relatively long as compared to the length of the leads that connect the other component parts of the circuit, such as lead 75 which connects contact 74 and terminal 39 of regulator 40. It thus can be seen that if the voltage were supplied to terminal 39 from rectifier terminal 24 via leads 35 and 41, a larger voltage drop would exist across these leads than would exist by feeding terminal 39 by leads 76 and 75. This voltage drop in a row voltage system, such as used on buses or motor vehicles, may greatly reduce the accuracy of control of the voltage regulator 40. With the switching circuit described, however, the terminal 39 of regulator 40 is connected to rectifier terminal 24 by relatively short leads thus reducing the voltage drops in the connecting leads to a minimum and insuring the supplying of an accurate control voltage to regulator 40.

The closure of contacts 71 and 73, and contacts 70 and 74 in response to the development of an output voltage by generator 10 produces still another control function in the circuit illustrated. When these contacts are closed as aforesaid, the opposite ends of lamp 86 are at the same electrical potential so that the lamp 86 is extinguished indicating that the generator is putting out an output voltage. The coils 87a and 87b of meter 87 in this mode of operation have equal voltages impressed across them so that pointed 89 remains in a vertical position, also indicating that the generator 10 is developing an output voltage.

From the foregoing it will be observed that relay 67, which responds to the presence or absence of generator output voltage, controls the circuit shown to prevent operation of starter 56 which generator 10 is producing an output voltage. The relay 67 also operates to prevent energization of loads 82 and 85 when the generator is not producing an output voltage and controls the operation of signals 86 and 87 and the switching of signal voltage to terminal 39 of regulator 40.

While the embodiments of the present invention as herein disclosed constitute a preferred form, it is to be understood that other forms might be adopted.

What is claimed is as follows:

1. An electrical system for a motor vehicle comprising, an alternating current generator having an output winding and a field winding, rectifier means connected with said output winding, a battery connected to be charged from said rectifier means, a signal lamp, manually operable switch means forming part of an energizing circuit from said battery for both said field winding and signal lamp when in a closed position, and voltage responsive switching means coupled to said generator for causing said signal lamp to be extinguished while connecting said field winding with a junction connected between said rectifier means and battery, said voltage responsive switching means being responsive to the output voltage of said generator and causing said signal lamp to be extinguished while connecting said field winding to said junction when the output voltage of the generator reaches a predetermined value.

2. In combination, an alternating current generator having a polyphase output winding and a field winding, a polyphase full-wave bridge rectifier connected with said output winding having first and second direct current output terminals, a battery, first and second conductor means respectively directly connecting said output terminals of said bridge rectifier with opposite sides of said battery whereby said battery remains connected across said output terminals whether or not said generator has an output voltage, a voltage regulating means having a field current control means and a voltage sensing circuit controlling said field current control means, said voltage regulating means having a field terminal and a second terminal, means connecting said field winding between said field terminal and said second conductor means, a manually operable switch connected between said first conductor means and said second terminal of said voltage regulating means, said manually operable switch, said voltage regulating means and said field winding series connected across said first and second conductor means to form a circuit for initially energizing the field winding of said generator from said battery when said manually operable switch is closed, and a second circuit connected between said first conductor means and said second terminal of said voltage regulating means for applying a sense voltage and field current to said voltage regulating means whenever said second circuit is closed, said second circuit including the contacts of a relay having an actuating coil, means connecting one side of said relay actuating coil with one of the output terminals of said bridge rectifier, and means connecting the opposite side of said actuating coil with the common junction of two rectifiers of said bridge rectifier and one of the phase windings of said output winding whereby said actuating coil is energized when said generator develops a predetermined output voltage but cannot be energized by said battery.

3. In combination, an alternating current generator having a polyphase output winding and a field winding, a polyphase full-wave bridge rectifier having A.C. input terminals connected with said output winding and direct current output terminals, a battery, first and second conductor means directly connecting respectively opposite sides of said battery with said direct current output terminals of said bridge rectifier, a voltage regulating means including a field current control means controlled by a voltage sensing circuit, said voltage regulating means having a field terminal and a second terminal, said field terminal connected to said field current control means and said second terminal connected to said voltage sensing circuit and field current control means, means connecting said field winding between said field terminal and said first conductor means, a first circuit including a manually operable switch connected between said second conductor means and said second terminal for initially energizing said field winding from said battery when said manually operable switch is closed, and a second circuit including relay contacts connected between said second conductor means and said second terminal of said voltage regulating means for energizing said voltage sensing circuit and said field winding when said relay contacts are closed, said relay having an actuating coil, means connecting one end of said actuating coil with one of said conductor means and means connecting the other end of said actuating coil with said output winding whereby said actuating coil is energized by said generator when it is developing an output voltage but cannot be energized by said battery.

4. In combination, an alternating current generator having a polyphase output winding and a field winding, a polyphase full-wave bridge rectifier having A.C. input terminals connected to said polyphase output winding and direct current output terminals, a battery, first and second conductor means respectively directly connecting said direct current output terminals of said bridge rectifier with opposite sides of said battery whereby said battery remains directly connected across said direct current output terminals of said bridge rectifier whether or not said generator has an output voltage, a voltage regulating means including a voltage sensing circuit operable to sense the voltage across said conductor means and including a field current control means controlled by said voltage sensing means, a field energizing circuit connected across said conductor means including in a series connection said field winding, said field current control means of said voltage regulating means and a manually operable switch, said field energizing circuit having a function, said field winding and field current control means series connected between said junction and said second conductor means, said manually operable switch connected between said junction and said first conductor means to thereby initially energize said field winding from said battery when said manually operable switch is closed, and means for applying a direct voltage across said junction and said second conductor means from said output winding to energize said field winding from said output winding whenever said generator has a predetermined output voltage, said last named means including at least the portion of said bridge rectifier connected with said second conductor means and a voltage responsive switching means connected to said junction and responsive to the attainment of an output voltage by said generator, said voltage responsive switching means comprising circuit means in addition to the rectifiers forming said bridge rectifier, said means for applying said direct voltage across said junction and said second conductor means applying no voltage thereto when said generator does not have an output voltage.

5. The combination according to claim 4 where the voltage regulating means is a transistor voltage regulator and wherein the field current control means comprises a transistor.

6. The combination according to claim 4 where a signal lamp is connected to said junction and is energized by said battery when said manually operable switch is closed and when said generator has not attained a predetermined output voltage, said signal lamp being extinguished by said voltage responsive switching means when said direct voltage is applied between said junction and second conductor means to thereby indicate the attainment of a predetermined output voltage by said generator.

7. A motor vehicle electrical system comprising, a direct current power supply unit including an alternating current generator and rectifier means having A.C. input terminals connected to the output winding of said generator, said generator having a field winding, said rectifier means haivng first and second direct current output terminals, a voltage regulator having an input terminal and a field terminal, said field terminal connected with said field winding whereby said field winding is energized through said voltage regulator, a battery, first and second conductor means respectively directly connecting opposite sides of said battery with said direct current output terminals of said rectifier means whereby said battery remains connected across said direct current output terminals of said rectifier means whether or not said generator has an output voltage, means connecting said field winding between said field terminal and said second conductor means, a first circuit connected between said first conductor means and said input terminal of said voltage regulator, said first circuit including a manually operable switch, said first circuit operative to initially energize said field winding from said battery through said voltage regulator when said manually operable switch is closed, a second circuit connected between said first conductor means and said input terminal of said voltage regulator and in parallel with said first circuit, and a voltage responsive switching means coupled with said output winding of said generator and with said first and second circuits for controlling the conductivity of said first and second circuits, said voltage responsive switching means responding to the output voltage of said output winding but connected so as not to respond to battery voltage, said voltage responsive switching means causing current to be supplied to the input terminal of said regulator from said first conductor means through said second circuit when the output voltage of said alternating current generator is above a predetermined value, said second circuit providing a sense voltage to said voltage regulator from said first conductor means whereby said voltage regulator properly responds to the voltage applied to said battery, said first circuit supplying excitation current to said field winding from said battery when the output voltage of the generator is below a predetermined value and during initial voltage buildup of the generator.

References Cited

UNITED STATES PATENTS

| | | | |
|---|---|---|---|
| 2,789,265 | 4/1957 | Hallidy | 320—28 |
| 2,738,457 | 3/1956 | Gilchrist | 322—28 |
| 2,752,554 | 6/1956 | Abell | 322—28 |
| 2,101,407 | 12/1937 | Morland | 340—52 |
| 2,722,673 | 11/1955 | Turner | 340—52 |
| 1,941,433 | 12/1933 | Doman. | |
| 2,131,026 | 9/1938 | Doman. | |
| 2,817,830 | 12/1957 | Raver | 320—48 X |
| 2,912,594 | 11/1959 | Raver | 320—48 X |

OTHER REFERENCES

Electrical Engineering, Cobb et al., February 1949, pp. 95–101.

ORIS L. RADER, Primary Examiner

G. R. SIMMONS, Assistant Examiner

U.S. Cl. X. R.

290—50; 320—64; 322—28